United States Patent Office 3,226,347
Patented Dec. 28, 1965

3,226,347
PROCESS FOR THE PREPARING OF THIXOTROPIC GELLED RESINS, PRODUCTS RESULTING THEREFROM, AND APPLICATIONS THEREOF
René Jacquier, Lyons, France, assignor to Resines et Vernis Artificiels, Paris, France, a French body corporate
No Drawing. Filed Jan. 12, 1961, Ser. No. 82,153
Claims priority, application France, Jan. 16, 1960, 815,860, Patent 1,254,962
16 Claims. (Cl. 260—22)

The present invention relates to the production of gelled resins which may be utilized for various uses and especially in the production of paints, coatings, etc. due to their thixotropic characteristics.

Indeed, said thixotropy makes it possible for both gelled resins and the products into which they are incorporated to become fluidified on stirring and to recover subsequently their gel characteristics. This facilitates to a considerable extent the actual use of such products, since they can be easily applied in fluid form while their reverting to a gel condition, after said application, prevents any running out or leakage.

Gelled resins having thixotropic characteristics are already known, but they possess certain drawbacks. Their subsequent reverting to the gel condition upon fluidification occurs too slowly, so that the advantages inherent to their utilization are partly lost.

It is the purpose of the present invention to obviate said drawbacks by providing new gelled resins having thixotropic characteristics which, upon fluidification, will rapidly revert to the gel condition, and which will preserve their thixotropic characteristics even when used in conjunction with large amounts of fillers, for example, with ten times their weight of fillers.

Said resins are prepared according to the invention by a process which comprises heating at temperatures in excess of 220° C. a mixture containing at least a neutral ester of allyl alcohol and of a saturated monocarboxylic acid or of a monocarboxylic acid containing at most one olefinic double bond or of a saturated dicarboxylic acid with at least one drying oil or semi-drying oil, or an oleoglycerophthalic resin, heating being continued until a reversible gel is obtained.

Indeed, it has been found according to the present invention that heating of such a reaction mixture at temperatures in excess of 220° C., when continued for a sufficiently long time, will result in a reversible gel which will resolve notably on stirring and which thus possesses marked thixotropic characteristics.

This is one of the essential distinctive features of the process according to the present invention as compared to processes wherein allyl esters were heated with oils for producing liquid materials having a viscosity of about 10,000 to 15,000 centipoises, and utilizable as varnishes for food packaging. In other words, apart from the fact that said known processes have used different reaction conditions, they have been interrupted at a stage prior to the formation of the reversible gel.

It should be mentioned here that the reversible gel condition is not the ultimate stage, which may result from heating allyl esters and oily constituents. Indeed, on continued heating, an irreversible gel is produced which is therefore not thixotropic and is not utilisable according to the present invention. There exists, however, a sufficient safety margin when proceeding according to the present invention, and said margin makes it possible to interrupt the reaction at the stage of reversible gel condition.

A detailed examination of the various features of the process according to the present invention will now follow.

The reactions occurring in the reaction mixture are interesterification and polymerization reactions. Said reactions require temperatures in excess of 220° C., a preferred range being 250 to 280° C. A catalyst such as litharge or calcium acetate may or may not be added to the reaction medium.

The pressure may be in excess of atmospheric pressure when so required by the volatility of the reagents at the operating temperatures.

Heating time varies with the temperature, the nature and the ratio of the various reagents with respect to one another. Said heating time is usually about 10 to 30 hours, the completion of the reaction being determined in all cases from the nature of the resultant product which must be a reversible gel.

The oily constituent of said reaction medium comprises its major portion and the allyl ester its minor portion. Within this general range the ratio of both reagents with respect to one another may vary to a fairly notable extent. Although results may already be obtained with a concentration of 5% by weight of allyl ester, 15 to 25% by weight of said ester are advantageously used, and said concentration may be further increased in the case of esters of monocarboxylic acids without causing detrimental effects on the solubility of the resulting gelled resins in aliphatic solvents.

In the practice of the process, the drying or semi-drying oils used either singly or in admixture may be linseed oil, soya-bean oil, cotton seed oil and the like, and generally the esters of drying or semi-drying fatty acids and of polyols or the constituents thereof. Said oils may be used as such or in the form of stand oils, of styrenated oils or of oxidized oils. As to the drying oleoglycerophthalic resins, these are all the conventional resins obtained by condensation of polyhydric alcohols, either singly or in admixture, with polycarboxylic acids, singly or in admixture, said resins being modified by fatty acids or oils.

The following are examples of neutral esters of allyl alcohols and of mono- or dicarboxylic acids, which may be used singly or in admixture:

The esters of saturated or unsaturated aliphatic or aromatic monoacids, such as the allyl acetate, benzoate, propionate, butyrate, heptanoate, acrylate, crotonate, and undecylenate, the allyl esters of fatty acids of the oils mentioned above.

The diesters of aliphatic or aromatic saturated dicarboxylic acids such as allyl phthalate and isophthalate, allyl malonate or succinate, allyl adipate and the like.

Within the scope of the present invention are also included the gelled resins obtained by the hereinbefore mentioned process and the products such as paints, coatings, filling pastes and the like in which said resins are incorporated. It is a valuable characteristic of these resins that their thixotropic character is preserved in the presence of solvent, of fillers and of other materials used for the preparation of paints and coatings.

Thus, said resins may be dissolved in any solvent utilized in the manufacture of paints and notably in aliphatic hydrocarbons such as white-spirit.

Said characteristics make it possible to prepare paints containing large amounts of fillers and pigments without incurring the risk of settling since such paints have good stability on storage. Said paints can be applied both by roller or by brush since temporary liquefaction occurs upon weak stress and since the return to the gel condition is instantaneous. This prevents any running-out or leakage on vertical walls and makes it unnecessary to use brush or roller several times over the same area. Thus, said paints offer numerous advantages with respect to filling properties, to high covering power, to unpenetration into porous substrata which make them valuable products. They dry rapidly in dust-free condition, and have good hardness. Their color has good stability both to light and to obscurity and they have most satisfactory resistance to atmospheric and chemical agents (detergents, etc. . . . ). The following examples are given for the purpose of illustrating the present invention and are not intended to be limitations on the scope of the invention.

EXAMPLE I 1500 parts, by weight, of linseed oil are added to 500 parts, by weight, of allyl phthalate, and the resulting mixture is heated to 260° C. until a gel is produced after 24 hours of heating. Temperature is maintained at this level for a further 15 minutes after the beginning of the gelling. The acid number of the resin is then 9.5. The product is cooled and diluted to 50% in white spirit. Said solution appears in the form of a soft thixotropic gel.

EXAMPLE II 200 parts of allyl phthalate are mixed with 800 parts of a castor-soybean oleoglycerophthalic resin with a 73% oil length, which has an acid number of 8, and a 25 centipoises viscosity at 50% in toluene. The mixture is heated for 10 hours at 260° C. upon which the gel appears; heating is continued for a further 15 minutes. The acid number is then 13.5. The product is cooled and diluted at 50% in white-spirit, yielding a thixotropic gelled product.

EXAMPLE III 640 parts, by weight, of linseed stand oil are mixed with 160 parts, by weight, of allyl isophthalate. The mixture is heated at 260° C. for 18 hours. A gelling appears, and heating is continued for a further 15 minutes. The acid number is then 19. The product is then cooled and diluted at 50% in white-spirit. The solution appears in the form of a thixotropic gel.

EXAMPLE IV 750 parts, by weight, of linseed stand oil are mixed with 250 parts, by weight, of allyl adipate. The mixture is heated for 15 hours and 30 min. at 260° C. Gelling appears, and heating is continued for a further 15 minutes. The acid number is then 10. The product is then cooled and diluted at 50% in white-spirit, yielding a product which is a thixotropic gel.

EXAMPLE V 1400 parts of 30 poises linseed stand oil are heated in a pressure vessel with 600 parts of allyl heptanoate. The temperature is increased to 260° C., and the pressure increases from 0.5 to 6 kg. Heating is continued for 6 hours while the pressure is maintained at 5–5.5 kg. The test is then resumed at ordinary pressure, with continued heating at 260° C. for 52 hours. Gelling occurs, and heating is continued for a further 15 minutes.

The product is then cooled, diluted at 50% in white-spirit, and appears in the form of a soft thixotropic gel.

EXAMPLE VI 600 parts, by weight, of linseed stand oil are mixed with 400 parts, by weight, of allyl undecylenate. The mixture is heated for 17 hours and 30 min. at 260° C. Gelling appears. Heating is then continued for a further 15 minutes. The product is cooled, is diluted at 50% in white spirit, and appears in the form of a thixotropic gel.

EXAMPLE VII 800 parts, by weight, of styrenated linseed oil are mixed with 200 parts, by weight, of allyl phthalate. The mixture is heated for 8 hours and 30 min. at 250° C. Gelling appears. Heating is continued for a further 15 minutes. The product is cooled, diluted at 50% in white spirit, and appears in the form of a thixotropic gel.

Two paint formulations using the resins according to the present invention will now follow:

(a) *Matt paint.*—A paste is formed in a mixer with:

340 parts of rutile titanium dioxide and
280 parts of calcium carbonate together with 150 parts, by weight, of thixotropic gelled resin obtained according to Example I. The mixture is milled in a three-roll mill, and the remainder of the formation is then added to a mixer, with strong stirring: drying agents, solvent, anti-skinning agents, additional binder. The final formulation is as follows:

| | Parts |
|---|---|
| Thixotropic gelled resin | 300 |
| Rutile titanium dioxide | 340 |
| Calcium carbonate | 280 |
| Lead naphthenate (20% lead) | 2 |
| Cobalt naphthenate (2% cobalt) | 2 |
| Anti-skinning agent | 0.9 |
| Petroleum | 60 |

(b) *Glossy paint.*—A paste is formed in a mixer with the following materials:

180 parts of rutile titanium dioxide and 100 parts, by weight, of thixotropic gelled resin obtained according to Example I.

The mixture is milled in a three-roll mill, and the remainder of the constituents of the formulation is then added to a mixer, with strong stirring: drying agents, solvent, anti-skinning agent, additional binder. The final formulation is as follows:

| | Parts |
|---|---|
| Thixotropic gelled resin | 300 |
| Rutile titanium dioxide | 180 |
| lead naphthenate (20% lead) | 2 |
| Cobalt naphthenate (2% cobalt) | 2 |
| Anti-skinning agent | 0.9 |
| Petroleum | 60 |

The present invention is not to be restricted to the embodiments described which have been given merely for illustrative purposes.

Having now described my invention, what I claim as new and desire to secure by Letters Patent is:

1. The process for the preparation of thixotropic gelled resins which comprises the heating of a mixture consisting essentially of at least one neutral ester of allyl alcohol selected from the group consisting of the esters of saturated monocarboxylic acids, esters of unsaturated monocarboxylic acids having a single olefinic double bond, esters of saturated dicarboxylic acids, and esters of aromatic carboxylic acids, and at least one oily constituent selected from the group consisting of natural drying oils, natural semi-drying oils and oleoglycerophthalic resins, said heating being at a temperature in the range from 250° to 280° C. and for a period in the range from 10 to 30 hours until a reversible thixotropic gel is obtained.

2. The process of claim 1, wherein the allyl alcohol ester concentration in the reaction mixture is in the range from 5% to 50% by weight.

3. The process of claim 2, wherein the allyl alcohol ester concentration in the reaction mixture is in the range from 15% to 25% by weight.

4. The process for the preparation of thixotropic gelled resins which comprises the heating of a mixture consisting essentially of an allyl alcohol ester of an aromatic carboxylic acid and at least one oily constituent selected from the group consisting of natural drying oils, natural semi-drying oils and oleoglycerophthalic resins, said heating being at a temperature in the range from 250° to 280° C. and for a period in the range from 10 to 30 hours until a reversible thixotropic gel is obtained, said heating being discontinued before said gel becomes irreversible.

5. The process of claim 4, wherein the allyl alcohol ester is allyl phthalate and the oily constituent is linseed oil.

6. The process of claim 4, wherein the allyl alcohol ester is allyl phthalate and the oily constituent is castor-soyabean oleoglycerophthalic resin.

7. The process of claim 4, wherein the allyl alcohol ester is allyl isophthalate and the oily constituent is linseed stand oil.

8. The process for the preparation of thixotropic gelled resins which comprises the heating of a mixture consisting essentially of an allyl alcohol ester of a saturated dicarboxylic acid and at least one oily constituent selected from the group consisting of natural drying oils, natural semi-drying oils and oleoglycerophthalic resins, said allyl alcohol ester being present in the mixture in a concentration in the range from 5% to 50% by weight, said heating being at a temperature in the range from 250° to 280° C. and for a period in the range from 10 to 30 hours until a reversible thixotropic gel is obtained, said heating being discontinued before said gel becomes irreversible.

9. The process of claim 8, wherein the allyl alcohol ester is allyladipate and the oily constituent is linseed stand oil.

10. Process for the preparation of thixotropic gelled resins which comprises heating a mixture consisting essentially of an allyl alcohol ester of an unsaturated monocarboxylic acid and at least one oily constituent selected from the group consisting of natural drying oils, natural semi-drying oils and oleoglycerophthalic resins, said allyl alcohol ester being present in the mixture in a concentration in the range from 5% to 50% by weight and said heating being at a temperature in the range from 250° to 280° C. and for a period in the range from 10 to 30 hours until a reversible thixotropic gel is obtained, said heating being discontinued before said gel becomes irreversible.

11. The process of claim 10, wherein the allyl alcohol ester is allyl undecylenate and the oily constituent is linseed stand oil.

12. A thixotropic resinous gel which is the reaction product formed by heating a mixture consisting essentially of at least one neutral ester of allyl alcohol selected from the group consisting of the esters of saturated monocarboxylic acids, esters of unsaturated monocarboxylic acids having a single olefinic double bond, esters of saturated dicarboxylic acids, and esters of aromatic carboxylic acids, and at least one oily constituent selected from the group consisting of natural drying oils, natural semi-drying oils and oleoglycerophthalic resins, said heating being at a temperature in the range from 250° to 280° C. and for a period in the range from 10 to 30 hours, until a reversible thixotropic gel is obtained.

13. The gel according to claim 12, in which the allyl alcohol ester concentration in the reaction mixture is in the range from 15% to 25% by weight.

14. The gel according to claim 12, in which the allyl alcohol ester is allyl phthalate.

15. The gel according to claim 12, in which the allyl alcohol ester is allyl adipate.

16. The gel according to claim 12, in which the allyl alcohol ester is allyl undecylenate.

References Cited by the Examiner

UNITED STATES PATENTS

| | | | |
|---|---|---|---|
| 2,530,315 | 11/1950 | Rust et al. | 260—22 |
| 2,536,568 | 1/1951 | Pollack | 260—23 |
| 2,562,139 | 7/1951 | Campbell | 260—33.4 |
| 2,562,140 | 7/1951 | Drafter | 260—22 |
| 2,671,060 | 3/1954 | Morris et al. | 260—23 |

FOREIGN PATENTS

| | | |
|---|---|---|
| 587,518 | 11/1959 | Canada. |
| 589,650 | 6/1947 | Great Britain. |
| 1,052,111 | 3/1959 | Germany. |

OTHER REFERENCES

Weilenmann: Chem. Abstracts, vol. 53, No. 8, April 25, 1959, p. 76663.

LEON J. BERCOVITZ, *Primary Examiner.*

MILTON STERMAN, *Examiner.*